United States Patent
Lippert et al.

(10) Patent No.: US 10,477,124 B2
(45) Date of Patent: Nov. 12, 2019

(54) DEVICE FOR IMAGING A SAMPLE WITH DETECTION OF AN ASYMMETRICALLY DISTRIBUTED ANGULAR RANGE

(71) Applicant: CARL ZEISS MICROSCOPY GMBH, Jena (DE)

(72) Inventors: Helmut Lippert, Jena (DE); Thomas Kalkbrenner, Jena (DE); Ingo Kleppe, Jena (DE); Joerg Siebenmorgen, Jena (DE); Ralf Wolleschensky, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/514,453

(22) PCT Filed: Aug. 31, 2015

(86) PCT No.: PCT/EP2015/069869
§ 371 (c)(1),
(2) Date: Apr. 12, 2017

(87) PCT Pub. No.: WO2016/045913
PCT Pub. Date: Mar. 31, 2016

(65) Prior Publication Data
US 2017/0280076 A1    Sep. 28, 2017

(30) Foreign Application Priority Data
Sep. 24, 2014 (DE) .................. 10 2014 113 827

(51) Int. Cl.
*H04N 5/357* (2011.01)
*G02B 21/36* (2006.01)
(Continued)

(52) U.S. Cl.
CPC ....... *H04N 5/3572* (2013.01); *G02B 21/0052* (2013.01); *G02B 21/06* (2013.01);
(Continued)

(58) Field of Classification Search
CPC .... H04N 5/3572; G02B 21/365; G02B 21/06; G02B 21/0052; G02B 21/082; G02B 21/361; G02B 21/0076
(Continued)

(56) References Cited

U.S. PATENT DOCUMENTS

| 498,048 A | 5/1893 | Craige |
|---|---|---|
| 7,554,725 B2 | 6/2009 | Stelzer et al. |

(Continued)

FOREIGN PATENT DOCUMENTS

| DE | 102 57 423 A1 | 6/2004 |
|---|---|---|
| DE | 10 2011 000835 A1 | 8/2012 |

(Continued)

OTHER PUBLICATIONS

International Search Report and Written Opinion for Application No. PCT/EP2015/069869, dated Nov. 20, 2015 (10 pages).
(Continued)

*Primary Examiner* — Lin Ye
*Assistant Examiner* — Chan T Nguyen
(74) *Attorney, Agent, or Firm* — Patterson Thuente Pedersen, P.A.

(57) ABSTRACT

A device and a method for imaging a sample arranged in an object plane. The device includes an optical relay system that images an area of the sample from the object plane into an intermediate image plane. The device may also include an optical imaging system with an objective having an optical axis that lies perpendicularly on the intermediate image plan, and which is focused on the intermediate image plane, with the result that the object plane can be imaged undistorted onto a detector. The device also can include an illumination apparatus for illuminating the sample with a light sheet, wherein the light sheet lies essentially in the object plane and defines an illumination direction, and
(Continued)

wherein the normal of the object plane defines a detection direction.

10 Claims, 5 Drawing Sheets

(51) Int. Cl.
  *G02B 21/06* (2006.01)
  *G02B 21/00* (2006.01)
  *G02B 21/08* (2006.01)
(52) U.S. Cl.
  CPC ......... *G02B 21/082* (2013.01); *G02B 21/361* (2013.01); *G02B 21/365* (2013.01); *G02B 21/0076* (2013.01)
(58) Field of Classification Search
  USPC ........................................................ 348/335
  See application file for complete search history.

(56) References Cited

U.S. PATENT DOCUMENTS

| 8,144,395 | B2 | 3/2012 | Wilson et al. |
| 8,498,048 | B2 | 7/2013 | Wilson et al. |
| 8,970,950 | B2 | 3/2015 | Stelzer |
| 9,030,734 | B2 | 5/2015 | Knebel et al. |
| 2006/0291048 | A1* | 12/2006 | Olszak ................ G02B 21/082 359/434 |
| 2011/0261446 | A1* | 10/2011 | Dunsby .............. G02B 21/0076 359/380 |
| 2015/0168723 | A1 | 6/2015 | Sing et al. |
| 2015/0168732 | A1 | 6/2015 | Singer et al. |
| 2016/0131884 | A1 | 5/2016 | Singer et al. |

FOREIGN PATENT DOCUMENTS

| DE | 10 2012 013163 A1 | 4/2014 |
| DE | 10 2013 105586 A1 | 12/2014 |
| JP | H 05-19172 A | 1/1993 |
| WO | WO 2004/053558 A1 | 6/2004 |
| WO | WO 2008/078083 A1 | 7/2008 |

OTHER PUBLICATIONS

International Preliminary Report on Patentability for Application No. PCT/EP2015/069869, dated Mar. 28, 2017 (6 pgs).

Translation of Written Opinion of the International Searching Authority for Application No. PCT/EP2015/069869, dated Nov. 30, 2015 (6 pgs).

* cited by examiner

DEVICE FOR IMAGING A SAMPLE WITH DETECTION OF AN ASYMMETRICALLY DISTRIBUTED ANGULAR RANGE

RELATED APPLICATIONS

The present application is a National Phase entry of PCT Application No. PCT/EP2015/069869, filed Aug. 31, 2015, which claims priority to DE 10 2014 113 827.9, filed Sep. 24, 2014, all said applications being hereby incorporated herein by reference in their entireties.

TECHNICAL FIELD

The invention relates to a device for imaging a sample arranged in an object plane. This device comprises an optical relay system which images an area of the sample from the object plane into an intermediate image plane. The object plane and the intermediate image plane with an optical axis of the relay system include an angle different from 90°, and the optical relay system is composed of several lenses. The device also comprises an optical imaging system with an objective, the optical axis of which lies perpendicularly on the intermediate image plane and which is focused on the intermediate image plane, with the result that the object plane can be imaged undistorted onto a detector. Finally, the device also comprises an illumination apparatus for illuminating the sample with a light sheet, wherein illumination light in the intermediate image plane or in a pupil plane is coupled into the beam path of the relay system and directed onto the sample by the relay system or is radiated directly into the object plane via a separate illumination beam path. Here, the light sheet lies essentially in the object plane and defines the direction of the illumination. The normal of the object plane—which also corresponds to the normal of the light sheet—defines a detection direction.

BACKGROUND

The optical relay system consists of several lenses. It can be constructed symmetrically with the result that the imaging by the optical relay system takes place on a scale of 1:1. However, this is not absolutely necessary; the imaging can also take place with magnification or demagnification.

Such a device is used in particular in the examination of biological samples, in which the illumination of the sample is carried out with a light sheet, the plane of which intersects the optical axis of detection at an angle different from zero. Typically here, the light sheet with the detection direction includes a right angle. With this technique, also referred to as SPIM (Selective Plane Illumination Microscopy), three-dimensional recordings even of thicker samples can be generated within a relatively short period of time. On the basis of optical sections combined with a relative movement in a direction perpendicular to the section plane, an image representation, which is expanded three-dimensionally, of the sample is possible.

The SPIM technique is preferably used in fluorescence microscopy, where it is then also referred to as LSFM (Light Sheet Fluorescence Microscopy). Compared with other established methods such as confocal laser scanning microscopy or two-photon microscopy, the LSFM technique has several advantages: since the detection can take place in the wide field, larger sample areas can be detected. In addition, the exposure of the samples to light is the lowest in this method, which among other things reduces the risk of bleaching of a sample since the sample is only illuminated by a thin light sheet at an angle to the detection direction which is different from zero. Instead of a purely static light sheet, a quasi-static light sheet can also be used. This is generated by rapidly scanning the sample with a light beam. The light-sheet-like illumination is produced when the light beam is subjected to a very rapid movement relative to the sample to be viewed and in the process is repeated in a temporal succession so as to be lined up side by side. Here, the integration time of the camera, on the sensor of which the sample is imaged, is chosen appropriately such that the scanning is completed within the integration time.

The SPIM technique has in the meantime been described on many occasions in the literature, for example in DE 102 57 423 A1 and WO 2004/0535558 A1 based thereon. Methods and arrangements by means of which a particularly thin light sheet can be constructed are described for example in DE 10 2012 013 163.1.

In the conventional SPIM arrangements, the illumination is carried out via a lens system which lies in the plane of the sample that is being illuminated. If the sample is thus for example viewed from above, the illumination has to be carried out from the side. Conventional preparation techniques can therefore not be used. A further fundamental disadvantage lies in the fact that both the illumination objective and the viewing objective have to be arranged spatially close to each other, with the result that a lens with a high numerical aperture which captures light from a wide area can be used for the detection. At the same time, however, a light sheet must also be generated. These mechanical limitations can lead to the numerical aperture and thus the resolution of the imaging system being restricted.

In order to overcome these limitations, SPIM optical systems have been developed in which the same objective is used for the illumination with a light sheet and simultaneously for the detection of fluorescence which comes from the sample. Here, the sample is illuminated with a light sheet via a partial area of the objective which includes an edge area of this objective, with the result that the illumination is thus carried out at an angle which is inclined relative to the optical axis of the objective. An opposite edge area of the objective is then used for the detection, with the result that the detection takes place in the centre likewise at an angle to the optical axis of the objective which is different from zero. As a result of the limited numerical aperture of the objective this angle is as a rule less than 90°, which is usual in the classical SPIM technique.

Such a setup is described for example in US 2011/0261446 A1. The imaging system therein is complemented by a relay system which consists of the mirror-symmetrical coupling together of two imaging subsystems. The two imaging systems are arranged mirror-symmetrically with regard to their optical elements, wherein the mirror plane corresponds to the original image plane of the object-side subsystem in which the illuminated area of the sample in the image thus intersects the image plane at an angle. The magnification of the relay system is chosen such that it corresponds to the ratio of the refractive indices of a first medium, in which the sample is located, to a second medium, in which the intermediate image is located.

If no immersion media are used, the optical components of the two subsystems can be chosen to be identical; however they are arranged in a mirror-inverted manner with the result that the imaging takes place on a 1:1 scale.

If one of the two subsystems is designed as an immersion system, the optical element which is closest to the sample is thus located in an immersion medium, and consequently according to US 2011/0261446 A1 magnifications should be chosen which correspond to the ratio of the refractive indices of the object-side medium and of an image-side medium or immersion medium. Using the optical relay system, which is symmetrical except for the use of immersion media, the object plane is thus imaged into an intermediate image in an intermediate image plane, wherein the intermediate image plane again coincides with the light sheet plane with the result that the object plane is represented undistorted and unmagnified relative to the intermediate image plane.

In order then to obtain a magnified representation of the sample in the object plane, US 2011/0261446 A1 provides an optical imaging system designed as a microscope which comprises an objective, the optical axis of which lies perpendicularly on the intermediate image plane. It is also focused on the intermediate image plane, and the focal planes of the relay system and of the imaging system intersect in the centre of the intermediate image. In this way an undistorted imaging of the sample, that is to say an imaging which is free from aberrations, can take place onto a detector with a magnification which is dependent on the microscope. The underlying principle is also described in WO 2008/078083 A1 according to which, using such a system, an object can be imaged at depth in a certain volume range in an image plane lying perpendicular to the optical axis without comatic aberration and spherical aberration.

Instead of a transmissive relay system composed of lenses, as is used in US 2011/0261446 A1, a partially catadioptric, i.e. reflectively operating system can also be used. Such a system is described for example in the previously unpublished DE 10 2013 105 586.9, by means of which the overall length and number of optical elements can be reduced.

It can be learned from US 2011/0261446 A1 that the angular distribution of the fluorescent beams to be detected in the plane spanned by the light sheet illumination direction and the optical axis of the relay system is symmetrical relative to the propagated optical axis of the optical imaging system which is downstream of the relay system. In the detection pupil there is no overlapping between excitation and detection beams. The numerical aperture of the optical imaging system which is downstream of the relay system also limits the angular spectrum of the sample that can be detected. Here, the numerical aperture of the relay system on the object side is larger than the numerical aperture of the optical imaging system.

A similar arrangement is described in DE 10 2011 000 835 A1 wherein the light sheet is generated by means of a scanning movement; it is thus a quasi-static light sheet. Here too, the angular spectrum of the detection beam path is arranged symmetrically relative to the optical axis of the optical imaging system which is downstream of the relay system, and the range of the angular spectrum here is also limited by the numerical aperture of the optical imaging system.

SUMMARY

The object of the invention is to improve a device of the type described at the beginning to the effect that the resolution that can be achieved during the detection is improved by simple means.

This object is achieved in that the optical imaging system is formed so as to detect a detection angular range distributed asymmetrically around the optical axis of the objective of the imaging system and to image it onto a detector. Whereas in the state of the art only a symmetrical detection angular range around the optical axis of the objective of the optical imaging system is detected, the optical imaging system according to the invention detects a considerably larger detection angular range with the result that the resolution overall is increased. The detection angular range here is the range of the detection angular spectrum which is actually detected.

Due to the asymmetrical detection angular spectrum which includes a larger angular range than in the state of the art, the resolution of the microscopic device can be increased. The full width at half maximum of the point spread function of the system is reduced due to the larger range which is available for the detection of the angular spectrum, however an asymmetry is at the same time also imposed on it due to the asymmetry of the detection angular spectrum. The device therefore also preferably comprises a detector and an evaluation unit connected thereto for image processing while taking into account such an asymmetrical point spread function and/or a point spread function that is compressed because of the boundary surface. In particular by deconvolving the captured image with the asymmetrical point spread function, blurring that is present in the image can be better corrected. However, even without deconvolution with the point spread function, which can only take place as part of image processing, an image with better resolution than in the state of the art is obtained.

Here, the object plane and the intermediate image plane with the optical axis of the relay system preferably include angles, the values of which are smaller than the aperture angle of the object-side or intermediate image-side detection aperture cone respectively of the relay system. The object plane and the intermediate image plane also lie at least partially in the object-side or intermediate image-side detection aperture cone respectively.

The intermediate image or the imaged light sheet plane between relay system and optical imaging system then lies within the possible detection angular spectrum which is dependent on the aperture of the relay system and its focal length and corresponds to the detection aperture cone. This leads to an inherent asymmetry of the detectable angular distribution of fluorescence in the plane spanned by the propagation direction and the optical axis of the relay system or the optical axis of the optical imaging system, i.e. perpendicular to the light sheet plane. The maximum possible partial area of the detectable angular spectrum of fluorescence in the plane mentioned is limited because of the position of the intermediate image plane in the detection aperture cone on the exit side of the relay system and is therefore asymmetrical in relation to the optical axis of the relay system.

The described device is preferably characterized in that the object plane lies at least partially within the object-side detection aperture cone and with the optical axis of the relay system thus includes an angle, the value of which is smaller than the aperture angle of the detection aperture cone. The object-side detection aperture cone is correspondingly transmitted to the side of the intermediate image by the relay system and there the intermediate image plane correspondingly lies at least partially within the intermediate image-side detection aperture cone. The optical axis of the relay system with the intermediate image plane includes an angle, the value of which is smaller than the aperture angle of the intermediate image-side detection aperture cone of the relay system. Thus, in this case, disruptive optical elements which could block out a part of the detection angular spectrum must not be arranged in the relay system.

For example for the detection of emitted fluorescent light, the entire range of the object-side aperture of the relay system is available with the result that the detection aperture cone of the relay system is only limited by the numerical aperture of the relay system on the object side. In the state of the art, a part of the object-side objective of the relay system is usually utilized for the coupling-in of excitation light, and this part of the objective is then no longer available for the detection since for example the illumination light is coupled in via a mirror which is located in the beam path of the relay system. Correspondingly, in this case the maximum possible, theoretically available detection aperture cone, which fully utilizes the entire aperture of the object-side objective of the relay system, cannot be achieved. As a consequence, the object plane and thus also the light sheet plane is not located in the detection aperture cone that is actually possible, with the same situation on the intermediate image side; here too, the intermediate image plane then lies outside the intermediate image-side aperture cone of the relay system. As a consequence, in the state of the art the angular spectrum is formed symmetrically relative to the optical axis of the optical imaging system and is also limited by the aperture of the optical imaging system which images the intermediate image into an image plane.

The intermediate image plane is thus located partially within the detection aperture cone transmitted by the relay system and reflected on a 1:1 scale in the case of a transmission. The optical imaging system is downstream of the relay system and is aligned in its optical axis perpendicular to this intermediate image plane. It collects fluorescent light or light to be detected within a further detection aperture cone, namely of the optical imaging system. Since the intermediate image plane lies within the transmitted detection aperture cone, the optical imaging system can detect a larger detection angular range than is possible in the state of the art; here this inevitably leads to an asymmetrical distribution of the detection angular range. Since the detectable detection angular range—even though asymmetrical—is increased, in this way the resolution can be increased overall.

It is advantageous here to choose the largest possible numerical aperture of the optical imaging system, in particular to choose it to be larger than the numerical aperture of the relay system in order to detect the largest possible detection angular range to maximize the resolution.

In addition, the device can be designed such that a first and a second optical medium are arranged between the optical relay system and the optical imaging system. Here, the first optical medium is arranged between the optical relay system and the intermediate image plane and the second optical medium between the intermediate image plane and the optical imaging system. The intermediate image plane then lies in the boundary surface between first and second optical medium, and the second optical medium has a higher refractive index than the first optical medium. The media can be formed as liquids, for example as immersion media, or as gelatinous or glass-like media which can also take on the function of an immersion medium if they are connected directly to the optical relay system or the optical imaging system. The boundary surface can also be optically microstructured in order effectively to achieve a larger jump in the refractive index than would be possible for simple boundary surfaces. In the case of a correspondingly high numerical aperture of the optical imaging system, preferably a larger aperture than that of the optical relay system, and in the case of a jump in the refractive index with the intermediate image plane as boundary surface—as a result of Snell's law of refraction—the angular range that can actually be detected may come very close to the theoretically possible angular range, however there is always asymmetry.

The introduction of a boundary surface involves a compression of the angular spectrum of a point source, i.e. the point spread function, which is not regarded as distortion here but must be taken into account accordingly in a later evaluation.

In particular, the previously described device can thus be used to illuminate a sample arranged in an object plane with a light sheet, wherein the light sheet lies essentially in the object plane and defines an illumination direction, and the normal of the object plane defines a detection direction. By means of an optical relay system, an area of the sample is imaged from the object plane into an intermediate image plane, wherein the object plane and the intermediate image plane with an optical axis of the relay system include an angle different from 90°. The intermediate image plane is imaged undistorted onto a detector by means of an optical imaging system with an objective, the optical axis of which lies perpendicularly on the intermediate image plane and which is focused on the intermediate image plane. It is recorded there as an image, wherein the optical imaging system (6) detects a detection angular range distributed asymmetrically around the optical axis (7). The recorded image is subsequently processed in an evaluation unit connected to the detector (8) while taking into account an asymmetrical point spread function on the basis of the asymmetrical detection angular spectrum and/or a compressed point spread function.

It is understood that the features mentioned above and those yet to be explained below can be used not only in the stated combinations but also in other combinations or alone without departing from the scope of the present invention.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The invention is explained in yet more detail below by way of example with reference to the attached drawings, which also disclose features essential to the invention. There are shown in.

Figure 1:
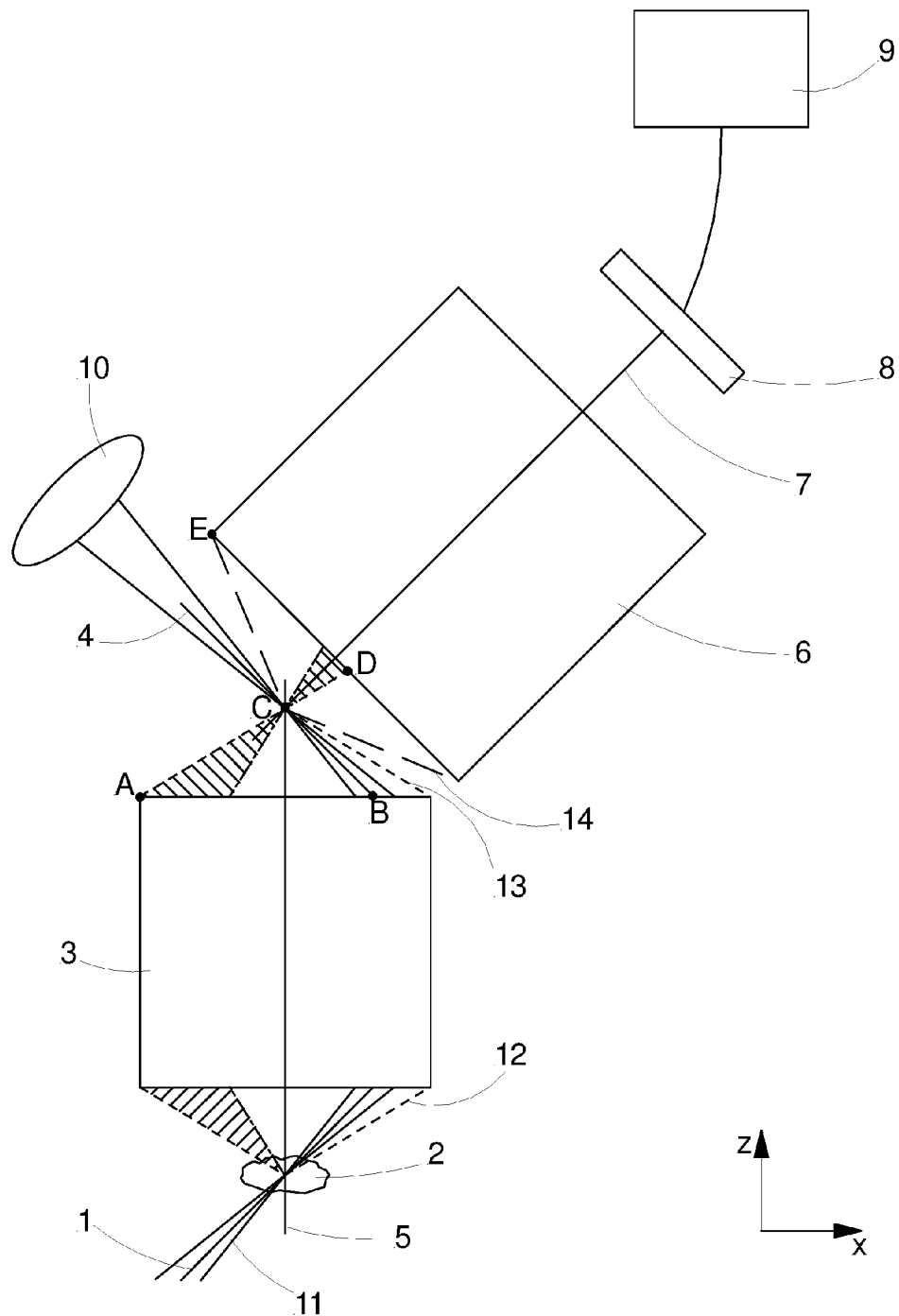
FIG. 1 the structure of a device for imaging a sample.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

With reference to FIG. 1, firstly the basic mode of operation of the device for imaging a sample 2 arranged in an object plane 1 will be explained. The device comprises an optical relay system 3 which images an area of the sample 2 from the object plane 1 into an intermediate image plane 4. The object plane 1 and the intermediate image plane 4 with an optical axis 5 of the optical relay system 3 include an angle different from 90°. The optical relay system 3 here is composed of several lenses. For example, it can be constructed symmetrically in relation to a plane of symmetry between the subsystems perpendicular to the optical axis 5 of the relay system, with the result that the imaging by the relay system 3 takes place on an image scale of 1:1. In this case, it can for example also be constructed as a so-called 4*f* system, wherein each subsystem comprises an objective and a tube lens. It can also be constructed catadioptrically, i.e. the one or more lenses are at least partially reflecting, whereby the structural size and number of lenses can be reduced. The relay system 3 can also be constructed non-symmetrically in order to produce a correspondingly magnified image in the intermediate image plane. This can also be achieved through the choice of suitable media—in particular immersion media—on the object or intermediate image side which differ in their refractive indices.

The device also comprises an optical imaging system 6 with an objective, the optical axis 7 of which lies perpendicularly on the intermediate image plane 4 and which is focused on the intermediate image plane 4, with the result that the object plane 1 as a whole can be imaged undistorted onto a detector 8. An evaluation unit 9 for image processing is connected to the detector 8.

Finally, the device for imaging the sample 2 also comprises an illumination apparatus 10 for illuminating the sample 2 with a light sheet 11. In the device shown in FIG. 1, illumination light in the intermediate image plane 4 is coupled into the beam path of the relay system 3 and directed onto the sample 2 by the relay system 3. Instead of the coupling-in in the intermediate image plane 4, a pupil plane of the relay system 3 can also be used for the coupling-in. It is furthermore conceivable for the illumination to be carried out independently of the relay system directly through irradiation in the sample space. The light sheet 11 is directed onto the sample 2 by the relay system 3 and lies essentially in the object plane 1; the illumination direction is defined in this way. The normal of the object plane 1 corresponds to the detection direction. The illumination is thus carried out at an angle, which is different from zero, to the detection direction. The light sheet 11 lies essentially in the object plane 1, wherein the term "essentially" means that the light sheet 11, as indicated in FIG. 1, has in the xz plane shown here a thickness which is different from zero and increases with increasing distance from the focal point. Here, the thickness of the light sheet 11 is represented by the two envelopes to the left and right of the object plane 1 or the intermediate image plane 4. Perpendicular to the plane of drawing, the light sheet 11 has a considerably greater extent.

The detection direction here lies perpendicularly on the object plane 1 or the intermediate image plane 4. The aperture of the sample-side objective of the optical relay system 3 in combination with the focus limits the maximum possible angular range in which emission light—for example fluorescent light which was excited by the light sheet—can be detected. This maximum possible angular range is, for the xz plane on the object side and intermediate image side, denoted by the short-dashed lines and when considered three-dimensionally the aperture defines an object-side detection aperture cone 12 and an intermediate image-side detection aperture cone 13, the section of which is represented in the xz plane here. The relay system 3 here is constructed symmetrically with the result that the intermediate image-side detection aperture cone 13 corresponds to a reflected object-side detection aperture cone 12.

In the state of the art the detection angular range is limited to a section of the object-side aperture cone 12 that is located symmetrically around the detection axis, which section is represented here by the hatched area within the object-side detection aperture cone 12 and correspondingly by a hatched area on the intermediate image side. In the state of the art the reasons for this are that a part of the beam path is reserved for the illumination and/or that the detection beam path is limited in the optical imaging system and/or that during the image evaluation no additional actions have to be carried out as a result of an asymmetrical detection angular spectrum, meaning that the evaluation is considerably simpler.

Figure 2:
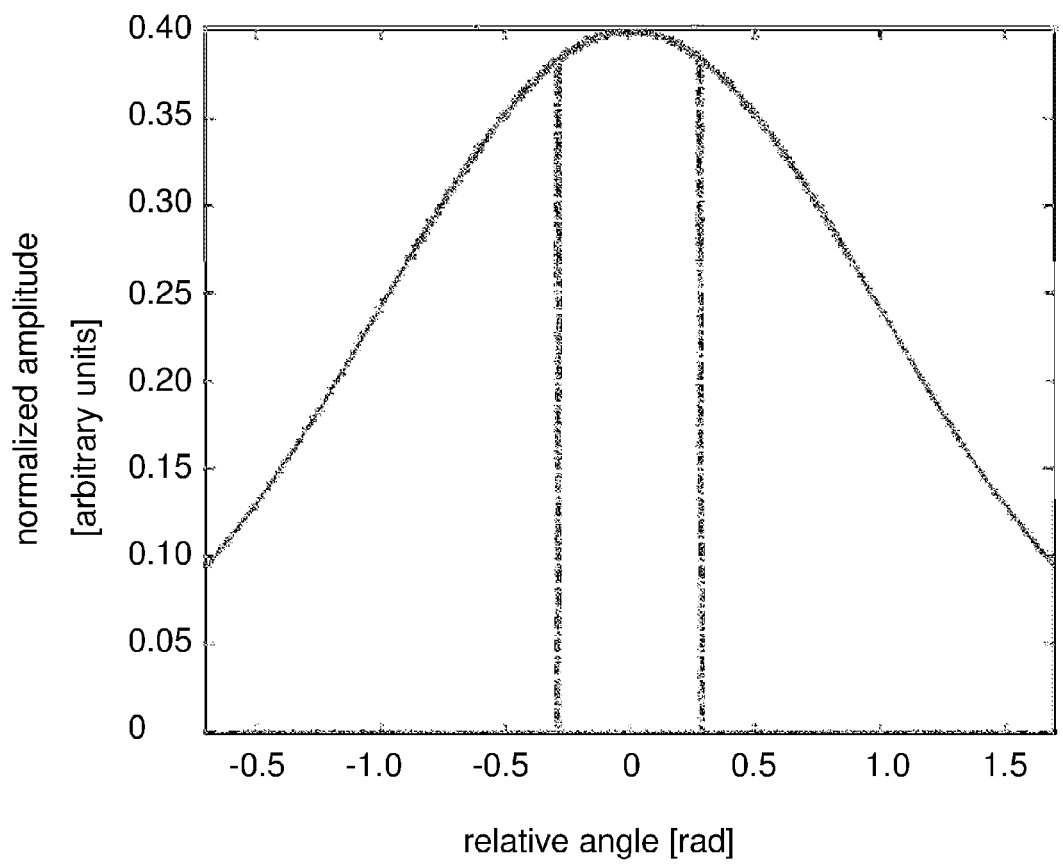
FIG. 2 the detectable angular distribution of the detection light according to the state of the art, FIG. 3 detection angular spectra for a first embodiment of such a device according to FIG. 1, FIG. 4 detection angular spectra for a second embodiment of such a device, FIG. 5 detection angular spectra for a third embodiment of such a device.

The associated detection angular spectrum, which can be detected by the optical imaging system 6 in this case, is represented in FIG. 2 by the dot-dashed line. The continuous line represents the maximum theoretically possible angular spectrum which is dependent solely on the aperture of the relay system 3 and/or of the optical imaging system 6. The normalized amplitude is shown in arbitrary units, and on the x-axis the relative angle in relation to the optical axis 7 of the optical imaging system 6 is shown in rad. Here, the detection angular spectrum that can actually be detected is highly cropped compared with the theoretically possible detection angular spectrum because of the requirement that it has to be located symmetrically with respect to the optical axis 7 of the optical imaging system 6.

In the device shown in FIG. 1, however, the situation is such that the object-side detection aperture cone 12 corresponds to the maximum aperture cone of the relay system 3 that is actually possible, the dimensions of which are specified solely by the corresponding data from an object-side objective of the relay system 3. The detection aperture cone 13 may also be slightly smaller than the maximum possible aperture cone of the relay system 3. In the example shown here, the object plane 1 with the optical axis of the relay system 3 includes an angle, the value of which is smaller than the aperture angle of the object-side detection aperture cone 12 of the relay system 3, and the object plane 1—and thus also the plane of the light sheet 11—lies at least partially within the object-side detection aperture cone 12. On the intermediate image side, the situation is comparable, that is to say the intermediate image plane 4 with the optical axis 5 of the relay system 3 includes an angle, the value of which is smaller than the aperture angle of the intermediate image-side detection aperture cone 13 of the relay system 3, and the intermediate image plane lies at least partially within the intermediate image-side detection aperture cone 13. This can clearly be seen in FIG. 1.

The intermediate image plane 4 is thus located within the reflected detection aperture cone 13. The optical imaging system 6 is aligned with its optical axis 7 perpendicular to the intermediate image plane 4 and collects the maximum fluorescent light in an imaging-side detection aperture cone 14, which is denoted here by the long-dashed lines. Since fluorescent light or generally emission light, which propagates at an angle of greater than 90° relative to the optical axis 7 of the optical imaging system 6, can in principle not be detected, the maximum theoretically possible partial area of the detection angular spectrum in the xz plane that can be detected with the setup shown in FIG. 1 is designated by the triangle with the corner points A, B and C. Since the intermediate image plane 4 or the plane of the imaged light sheet 11 is located in the potentially possible intermediate image-side detection aperture cone 13, the actually possible partial area is cropped and is smaller than the potentially possible partial area. In addition, this maximum theoretically possible partial area which is defined by the triangle ABC is asymmetrical in relation to the optical axis 5 of the relay system 3.

The partial area that can actually be detected by the optical imaging system 6 is sometimes restricted to an even greater extent than the maximum theoretically possible partial area. This is dependent on the aperture of the optical imaging system 6. In each case, the detection angular range that can actually be detected by the optical imaging system 6 and is designated by the triangle CDE covers a considerably larger angular range than the symmetrical hatched cone in accordance with the state of the art, but is distributed asymmetrically around the optical axis 7 of the optical imaging system 6. This detection angular range which is larger compared with the state of the art results in a higher resolution of the device, even though the detection angular spectrum is distributed asymmetrically around the optical axis 7 of the optical imaging system 6.

Here, the imaging-side detection aperture cone 14 can be further enlarged if a larger numerical aperture of the optical imaging system 6 is also chosen. The numerical aperture of the optical imaging system 6 is therefore preferably larger than the numerical aperture of the relay system 3. Additionally or alternatively, a boundary surface which causes a jump in the refractive index can also be introduced in the intermediate image plane. For this purpose, a first optical medium is arranged between the optical relay system 3 and the intermediate image plane 4 and a second optical medium is arranged between the intermediate image plane 4 and the optical imaging system 6. The intermediate image plane 4 lies on the boundary between first and second optical medium, i.e. in the boundary surface. The second optical medium has a higher refractive index than the first optical medium. The optical media in each case cover the beam paths up to the relay system 3 or optical imaging system 6 and they can be for example immersion media or gelatinous substances; glasses are also possible embodiments. In this way, the partial area that can actually be detected can come as close as possible to the theoretically possible partial area. In each case, an asymmetry remains which, as regards imaging, produces an asymmetrical or not point-symmetrical point spread function for the entire device. The evaluation unit 9 is preferably suitable for image processing while taking into account an asymmetrical point spread function on the basis of the asymmetrical detection angular spectrum, and in this way the point spread function can be used for the image evaluation and can contribute to an increase in sharpness in the context of a deconvolution. Alternatively or additionally, the evaluation unit is also suitable for taking into account or offsetting a compressed point spread function, as occurs at the described boundary surface in the intermediate image plane due to Snell's law of refraction.

Figure 3:
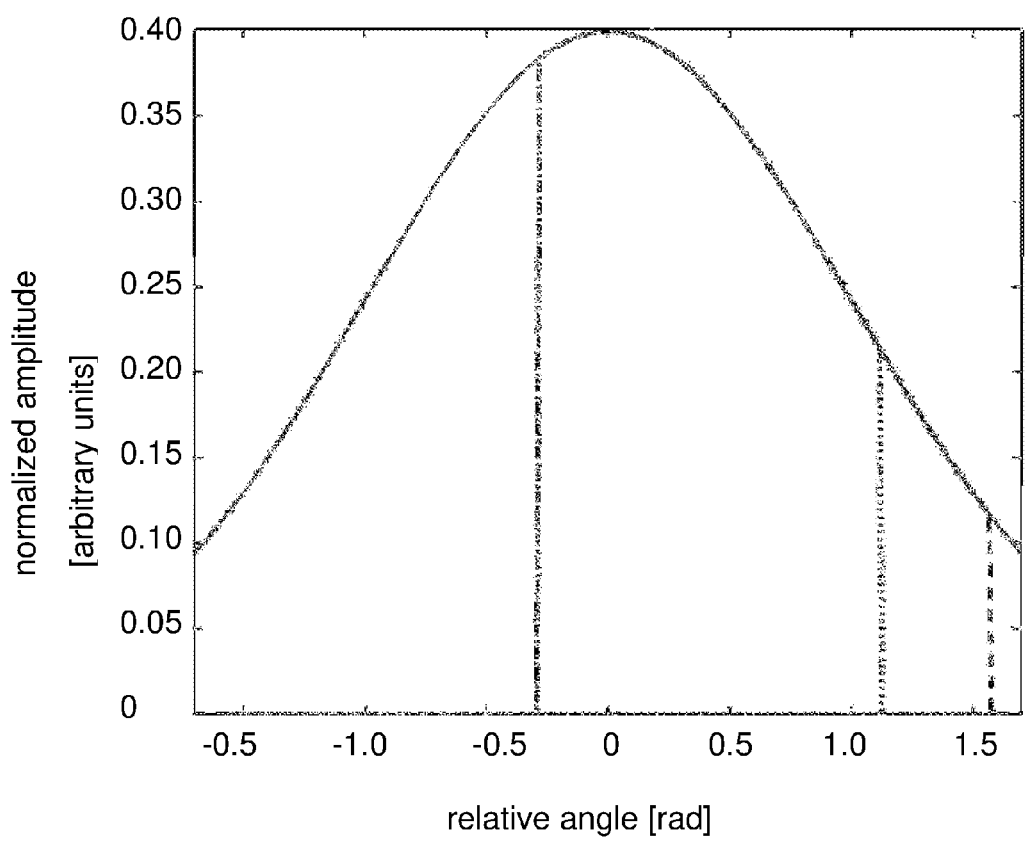
Figure 4:
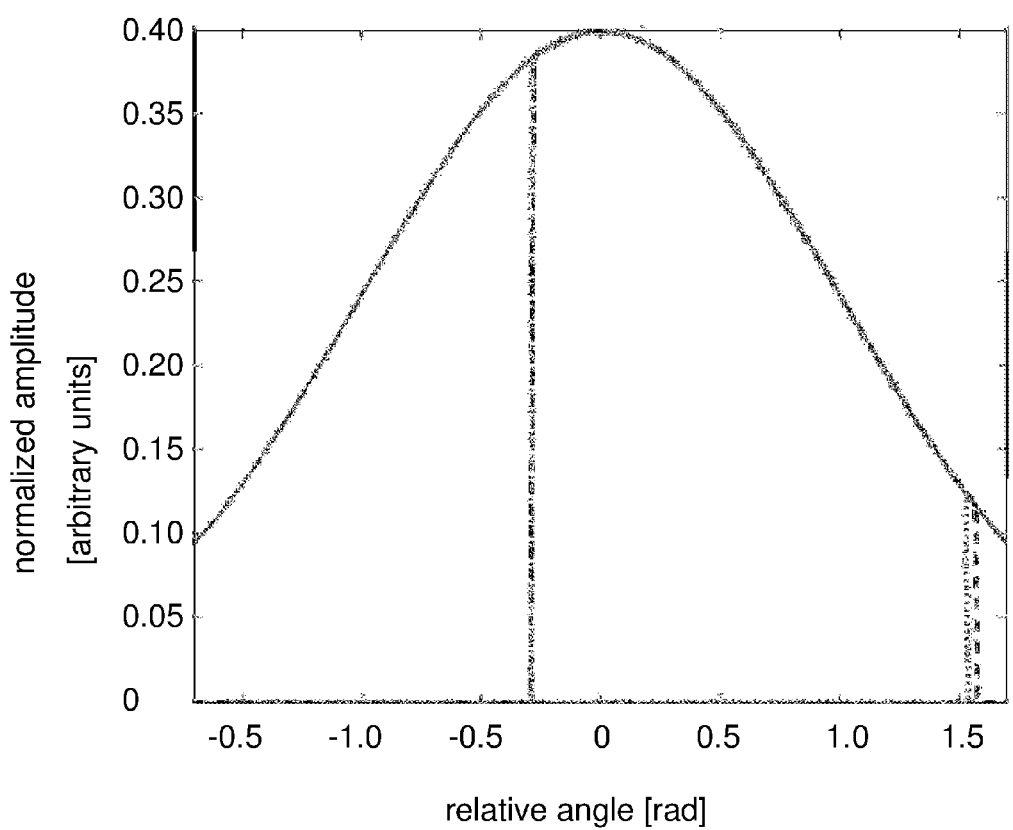
Figure 5:
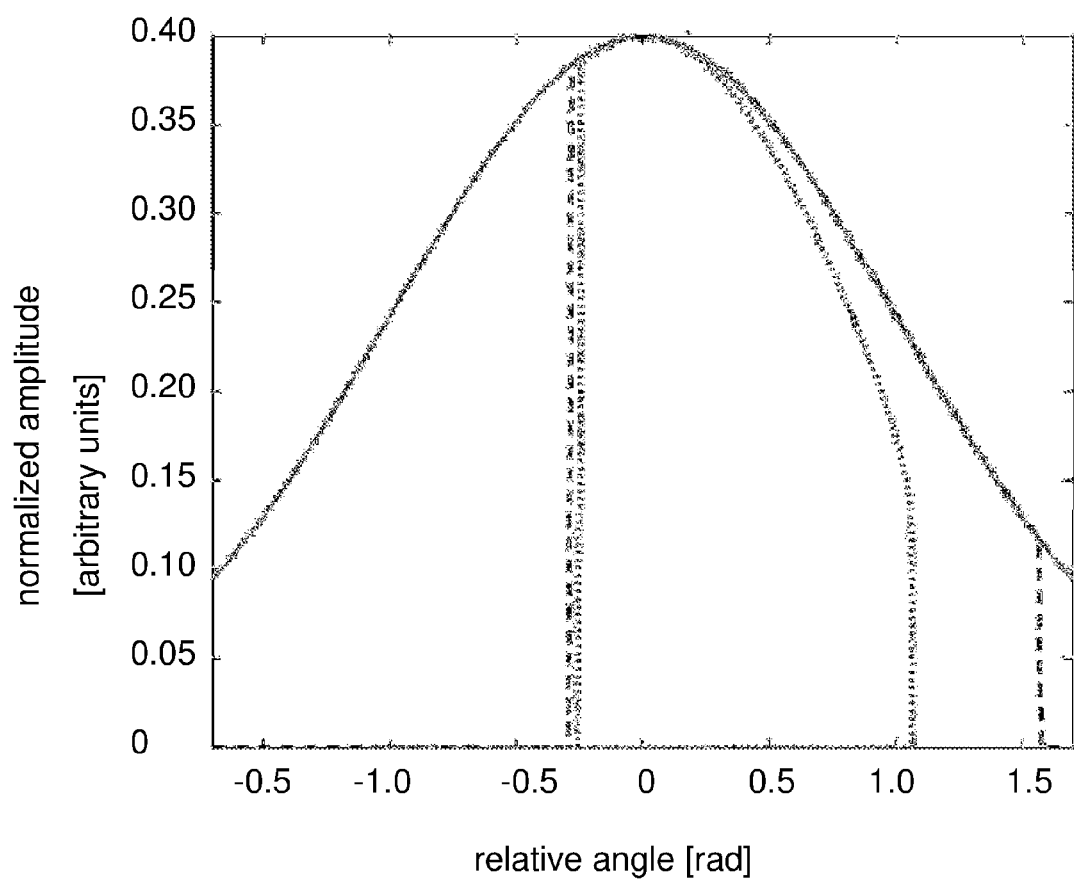

In FIGS. 3-5, the detection angular spectra are shown for various configurations of the device. The figures in each case show a section in the xz plane through the amplitude portion of the light emitted by the sample, i.e. of the detection angular spectrum, by means of a continuous line. The phase portion is in this case disregarded, which is appropriate when considering fluorescence emission. The form of the detection angular spectrum here is randomly selected and serves only for illustration. The abscissa shows the angle relative to the optical axis 7 of the optical imaging system 6.

In the case represented in FIG. 3, the numerical aperture of the optical relay system 3 is 1.2 and is identical to the numerical aperture of the optical imaging system 6. Only one medium was used here, namely water with a refractive index of 1.33. The relay system 3 is constructed symmetrically and the optical imaging system 6 is at an angle of 48° to the relay system 3 in relation to the optical axes. The maximum theoretically possible partial area of the detection angular spectrum that can be detected and corresponds to the triangle ABC in FIG. 1, which can be detected downstream of the relay system 3, is shown as a dashed line. Compared with the original angular spectrum, this partial area is cropped because of the aperture of the relay system 3 and due to the fact that the intermediate image plane 4 lies within the detection aperture cone 13, in relation to which the optical imaging system must detect perpendicularly. The partial area that can actually be detected and corresponds to the triangle CDE in FIG. 1 is shown as a dotted line in FIGS. 3-5. Here, there is further cropping due to the fact that in turn only a certain partial area can be covered with the aperture of the optical imaging system 6, and the point spread function of the system is asymmetrical in relation to the optical axis 7 of the optical imaging system 6.

While the area that can actually be detected is thus already enlarged compared with the state of the art, it may be attempted in order to increase the resolution to detect an even larger part of the theoretically possible spectrum shown as a dashed line. This case is shown in a simulation in FIG. 4. The numerical aperture of the optical imaging system 6 here is 1.329, which however cannot be achieved when water is used as immersion medium with a refractive index of 1.33 since the entire half-space would have to be detected and the point E of the triangle would be shifted into the intermediate image plane.

While there are therefore limits to the increase in the numerical aperture of the optical imaging system 6, an enlargement of the area that can actually be detected can also be effected by introducing a jump in the refractive index in the intermediate image plane 4. This is shown in FIG. 5; here water with a refractive index of 1.33 is used as first medium between relay system 3 and intermediate image plane 4 and BK7 glass with a refractive index of 1.52 is used as second medium between the intermediate image plane 4 and the optical imaging system 6. The numerical aperture of the optical imaging system 6 is then 1.329 and lies in the achievable range as a result of the choice of media. The theoretically possible spectrum is then completely detected, which is shown by the dotted line in FIG. 5. It can also be seen that it is compressed due to Snell's law of refraction, but not distorted. Information is not lost in this way, however the compression, like the asymmetry which is still present, equally has to be taken into account during image processing, during which the point spread function is also taken into account. Compression and point spread function can be taken into account within the scope of a deconvolution.

If an asymmetrical, possibly compressed detection angular spectrum and associated therewith an asymmetrical and likewise possibly compressed point spread function are allowed in the detection, the resolution of the system as a whole can be increased.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

LIST OF REFERENCE NUMBERS 1 object plane
2 sample
3 optical relay system
4 intermediate image plane
5 optical axis
6 optical imaging system
7 optical axis
8 detector
9 evaluation unit
10 illumination apparatus
11 light sheet
12 object-side detection aperture cone
13 intermediate image-side detection aperture cone
14 imaging-side detection aperture cone
A, B, C,
D, E, F corner points of triangles

The invention claimed is:

1. A device for imaging a sample arranged in an object plane, comprising:
an optical relay system which images an area of the sample from the object plane into an intermediate image plane, wherein the object plane and the intermediate image plane with an optical axis of the relay system include an angle different from 90° and the optical relay system is composed of several lenses;
an optical imaging system with an objective, the optical axis of which lies perpendicularly on the intermediate image plane and which is focused on the intermediate image plane, with the result that the object plane can be imaged undistorted onto a detector;
an illumination apparatus for illuminating the sample with a light sheet, wherein the light sheet lies essentially in the object plane and defines an illumination direction, and the normal of the object plane defines a detection direction, the system characterized in that the optical imaging system includes an aperture enabling the optical imaging system to detect a detection angular range distributed asymmetrically around the optical axis of the objective and to image it onto the detector.

2. The device according to claim 1, characterized in that the object plane and the intermediate image plane with the optical axis of the relay system each include an angle, the value of which is smaller than the aperture angle of an object-side detection aperture cone or of an intermediate image-side detection aperture cone respectively of the relay system, and the object plane and the intermediate image plane lie at least partially within the object-side detection aperture cone or the intermediate image-side detection aperture cone respectively.

3. The device according to claim 1, comprising an evaluation unit connected to the detector for image processing while taking into account an asymmetrical point spread function on the basis of the asymmetrical detection angular spectrum and/or a compressed point spread function.

4. The device according to claim 1, characterized in that the numerical aperture of the optical imaging system is larger than the numerical aperture of the relay system.

5. The device according to claim 1, characterized in that a first optical medium is arranged between the optical relay system and the intermediate image plane and a second optical medium is arranged between the intermediate image plane and the optical imaging system, wherein the intermediate image plane lies in the boundary surface between first and second optical medium and the second optical medium has a higher refractive index than the first optical medium.

6. The device according to claim 1, characterized in that the relay system is constructed symmetrically in relation to a plane of symmetry between the subsystems perpendicular to the optical axis of the relay system, with the result that the imaging by the relay system takes place on an image scale of 1:1, and/or in that the relay system is constructed catadioptrically.

7. The device according to claim 1, characterized in that illumination light in the intermediate image plane is coupled into a beam path of the relay system for illuminating the sample with the light sheet.

8. The device according to claim 1, characterized in that illumination light for illuminating the sample with the light sheet is coupled into a beam path of the relay system by using a pupil plane of the relay system.

9. A method for imaging a sample arranged in an object plane, in which the sample is illuminated with a light sheet, wherein the light sheet lies essentially in the object plane and defines an illumination direction, and the normal of the object plane defines a detection direction, an area of the sample is imaged from the object plane by means of an optical relay system into an intermediate image plane, wherein the object plane and the intermediate image plane with an optical axis of the relay system include an angle different from 90°, the intermediate image plane is imaged by means of an optical imaging system with an objective, the optical axis of which lies perpendicularly on the intermediate image plane and which is focused on the intermediate image plane, undistorted onto a detector and is recorded there as an image, wherein the optical imaging system includes an aperture which enables detection of a detection angular range distributed asymmetrically around the optical axis, the recorded image is processed in an evaluation unit connected to the detector while taking into account an asymmetrical point spread function on the basis of the asymmetrical detection angular spectrum and/or a compressed point spread function.

10. A method according to claim 9, characterized in that the object plane and the intermediate image plane lie at least partially within the object-side detection aperture cone or the intermediate image-side detection aperture cone respectively.

* * * * *